US011099103B2

(12) United States Patent
Skalny et al.

(10) Patent No.: US 11,099,103 B2
(45) Date of Patent: Aug. 24, 2021

(54) PROPULSION SYSTEM TESTING USING A SECOND VEHICLE AS A DYNAMOMETER

(71) Applicant: U.S. GOVERNMENT AS REPRESENTED BY THE SECRETARY OF THE ARMY, Washington, DC (US)

(72) Inventors: David A. Skalny, Shelby Township, MI (US); John M. Zwally, Canton, MI (US); Tyruss J. Valascho, Clarkston, MI (US); Matthew W. Skalny, Shelby Township, MI (US); Craig W. Schmehl, Royal Oak, MI (US)

(73) Assignee: Government of the United States, as represented by the Secretary of the Army, Washington, DC (US)

( * ) Notice: Subject to any disclaimer, the term of this patent is extended or adjusted under 35 U.S.C. 154(b) by 292 days.

(21) Appl. No.: 16/285,507

(22) Filed: Feb. 26, 2019

(65) Prior Publication Data

US 2020/0271548 A1    Aug. 27, 2020

(51) Int. Cl.
| | |
|---|---|
| *G01M 17/007* | (2006.01) |
| *G01M 99/00* | (2011.01) |
| *G01M 13/023* | (2019.01) |
| *G01L 5/13* | (2006.01) |
| *G01L 5/00* | (2006.01) |

(52) U.S. Cl.
CPC ....... *G01M 17/0074* (2013.01); *G01L 5/0042* (2013.01); *G01L 5/13* (2013.01); *G01M 13/023* (2013.01); *G01M 99/005* (2013.01)

(58) Field of Classification Search
CPC .......... G01M 13/023; G01M 17/0074; G01M 99/005; G01M 17/007; G01L 5/13; G01L 5/0042; Y10S 901/01
USPC ................ 73/116.01, 116.05–116.09, 116.11
See application file for complete search history.

(56) References Cited

U.S. PATENT DOCUMENTS

| | | | |
|---|---|---|---|
| 3,345,865 A | 10/1967 | Ostrander | |
| 3,848,785 A | 11/1974 | Bott | |
| 3,861,204 A * | 1/1975 | Fillingim | .......... G01M 17/0072 73/116.06 |
| 3,947,764 A | 3/1976 | Abbott et al. | |

(Continued)

FOREIGN PATENT DOCUMENTS

| | | |
|---|---|---|
| CN | 206557351 U | 10/2017 |
| CN | 107543699 A | 1/2018 |

*Primary Examiner* — Eric S. McCall
*Assistant Examiner* — Timothy P Graves

(57) ABSTRACT

One example is test system for testing the propulsion system(s) of vehicles. The test system includes a retention fixture, a linking device, a test logic, a measurement device and a result logic. The retention fixture is for rigidly mounting first and second vehicles to the retention fixture. The linking device links propulsion systems of the first and second vehicles so that the propulsion systems operate a different rates. The test logic subjects the second vehicle's propulsion system to a propulsion test. The measurement device measures at least one parameter associated with the propulsion system of the first vehicle while the first vehicle is subjected to the propulsion test. The result logic determines if the first vehicle under test passed the propulsion test based, in part, on the at least one parameter and generates an indication if the first vehicle passed or failed the propulsion test.

23 Claims, 11 Drawing Sheets

(56) References Cited

U.S. PATENT DOCUMENTS

| | | | |
|---|---|---|---|
| 4,319,298 | A | 3/1982 | Davis et al. |
| 4,326,655 | A | 4/1982 | Gradek et al. |
| 4,455,866 | A | 6/1984 | Barrigar |
| 4,798,088 | A | 1/1989 | Haeg et al. |
| 5,574,226 | A | 11/1996 | Reuther et al. |
| 6,360,591 | B1 | 3/2002 | Carley |
| 6,446,501 | B1 | 9/2002 | Domeck et al. |
| 7,213,449 | B2 | 5/2007 | Barnes et al. |
| 7,841,233 | B2 | 11/2010 | Cogotti |
| 8,950,275 | B2 | 2/2015 | Gray et al. |
| 2010/0010668 | A1 | 1/2010 | Udono |
| 2010/0251832 | A1 | 10/2010 | Kirkpatrick |
| 2015/0007643 | A1* | 1/2015 | Gray ................ G01M 17/0074 73/116.11 |
| 2016/0131549 | A1 | 5/2016 | Son et al. |

* cited by examiner

PROPULSION SYSTEM TESTING USING A SECOND VEHICLE AS A DYNAMOMETER

GOVERNMENT INTEREST

The inventions described herein may be made, used, or licensed by or for the U.S. Government for U.S. Government purposes without payment of royalties.

TECHNICAL FIELD

A dynamometer test relates generally to small unmanned vehicles. In particular, the dynamometer test relates generally to testing self-propelled robots. In more detail, the dynamometer test relates generally to testing self-propelled robots having independent surface propulsion systems.

BACKGROUND

Conventional approaches to dynamometer test systems, and other related technologies may not provide the capabilities for specialized vehicle (e.g., small, tracked unmanned ground vehicles (UGVs), and the like) testing that is sometimes desired. A traditional approach includes building a test track so that a robotic vehicle under test may traverse the test track while test equipment monitor various parameters of the vehicle being tested. These traditional test approaches may work well for larger vehicles under test but may be much less accurate for smaller, autonomous robotic vehicles, plus these traditional test methods require a test track to be constructed at significant land and monetary cost for testing vehicles.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One example is a test system for testing a propulsion system of a vehicle. The test system includes: a mounting frame, a belt, a test logic, a measurement device and a result logic. The mounting frame is configured to have a first vehicle under test mounted to the mounting frame and is configured to have a second vehicle mounted to the mounting frame. The belt is configured to be rotatably attached to a rotational drive component of a propulsion system of the first vehicle and to a rotational drive component of a propulsion system of the second vehicle so that the rotational drive component of the first vehicle operates at a different angular speed than the rotational drive component of the second vehicle. The test logic is configured to control at least the propulsion system of the second vehicle to subject the first vehicle to a propulsion test. The measurement device is configured to measure at least one parameter associated with the propulsion system of the first vehicle while the first vehicle is being subjected to the propulsion test. The result logic is configured to determine if the first vehicle under test passed the propulsion test based, at least in part, on an analysis of the at least one parameter. The result logic is further configured to generate an indication if the first vehicle under test passed or failed the propulsion test.

Another configuration includes a test system for testing the propulsion systems of vehicles. A retention fixture is configured for rigidly mounting a first vehicle under test to the retention fixture and is configured to rigidly mount a second vehicle to the retention fixture. A linking device is configured to link a propulsion system of the first vehicle to a propulsion system of the second vehicle so that the propulsion system of the first vehicle operates at a different speed than the propulsion system of the second vehicle. A test logic is configured to control at least the propulsion system of the second vehicle to subject the first vehicle to a propulsion test. A measurement device is configured to measure at least one parameter associated with the propulsion system of the first vehicle while the first vehicle is being subjected to the propulsion test. A result logic is configured to determine if the first vehicle under test passed the propulsion test based, at least in part, on an analysis of the at least one parameter. The result logic is configured to generate an indication if the first vehicle under test passed or failed the propulsion test.

Another configuration is a method of testing a vehicle. The method begins by coupling a propulsion system of a first vehicle under test to a propulsion system of a second vehicle so that a speed of the propulsion system of the first vehicle is reduced compared to a speed of the second vehicle. A run test is performed where the second vehicle uses the propulsion system of the second vehicle to simulate the first vehicle to respond to the run test. The run test was derived from values associated with a test run of a benchmark vehicle navigating a test track. A determination is made if the first vehicle under test passed the run test based, at least in part, on result signals derived from the first vehicle during the run test. An indication is output that indicates if the first vehicle passed the test base, at least in part, on the results signals.

The following description and the annexed drawings set forth in detail certain illustrative aspects of the subject matter. However, these aspects are indicative of some of the numerous ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
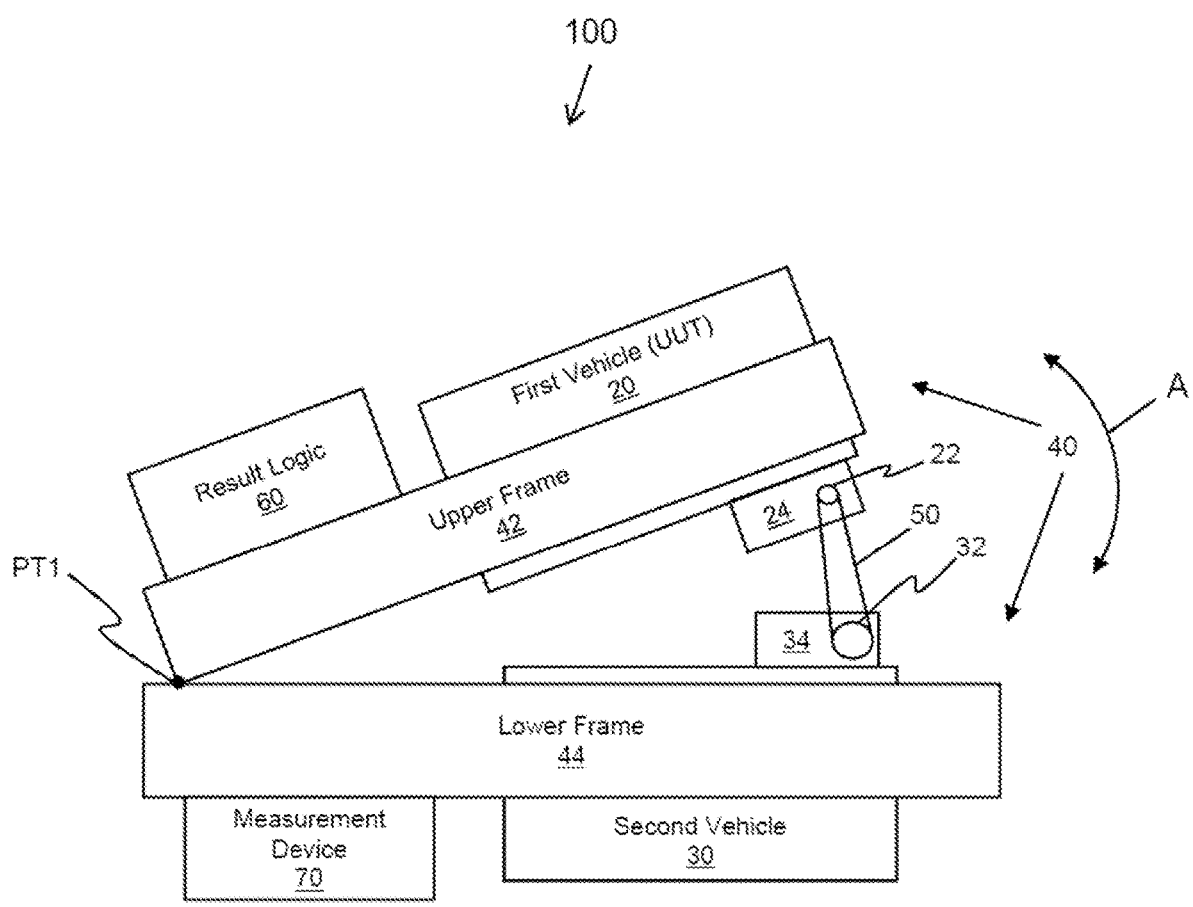
FIG. 1 illustrates an embodiment of a test system for testing a maneuverability of a first vehicle.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

As also mentioned below, the various embodiments described herein can be implemented with hardware logic, software, or a combination of both that may in turn implement the various embodiments as systems, apparatus, components, and methods or any other type/kind of implementation with a combination of these approaches and without limitation to the various embodiments described herein. References can be made herein to mobile vehicles without limitation to the various embodiments or claims scope. References to terrestrial mobile vehicles, mobile robots, vehicles with wheels, tracks, legs or other propulsion devices and systems is done for example purposes only. The embodiments described herein may be useful in some aspect to any type of propulsion system and the like, without limitation, and other similar environments and uses as understood by those of ordinary skill in this art.

Prior art test systems such as U.S. Pat. No. 8,950,275 titled "System and Method for Tracked Vehicle Dynamometer Testing, which is wholly incorporated herein by reference, were configured as "treadmill" types of electric chassis dynamometers having dual, parallel endless belts positioned as substantially flat surfaces with cleats, i.e., the tracks of a test vehicle and a dynamometer vehicle as illustrated in U.S. Pat. No. 8,950,275. In this type of system there are three vehicles that may be involved, the baseline vehicle, the "dynamometer" vehicle, and the vehicle under test. First, the baseline vehicle is field tested by driving an actual field/track in real-world environmental conditions and recording loads, torques, and the like experienced by the baseline vehicle in the field while experiencing real ground conditions, inclinations, atmospheric conditions, etc. Next, the dynamometer vehicle is selected to be identical or similar (i.e., model, same manufacture, series, variant, etc.) as the baseline vehicle. If parameters of interest (generally loads and torques on the drivetrain) differ in the laboratory then what were measured on an actual test track/environment, then the dynamometer vehicle may be modified with electric circuits are other devices to accurate recreate the parameters of interest in the laboratory. Having achieved this, the dynamometer vehicle is now used to recreate the actual baseline field conditions in a test/laboratory environment to accurately test additional vehicles under test. This is performed by coupling a vehicle under test to the dynamometer vehicle and monitoring how the vehicle under test responds to test conditions (loads, torques, etc.) created by the dynamometer vehicle.

In the past, track assemblies of a robotic test vehicle and a dynamometer vehicle were generally vertically and mechanically coupled in close contact with each other via a retention fixture (See U.S. Pat. No. 8,950,275). These prior art systems may not generate torque values below the combined torque of two tracks due to the track-to-track interface and one-to-one ratio of the two track sprockets. This meant that the apparatus could not simulate several natural terrains where the torque request signal was on average less than the torque required to spin two robot tracks in direct contact with one another.

The test system 100 of FIG. 1 eliminates the need for a direct one-to-one track-to-track interface between a vehicle under test and a dynamometer vehicle. Instead, the test system 100 of FIG. 1 uses a belt and pulley system (discussed below) that allows for a reduction in torque through pulley ratios. For example, a pulley ratio of about 1:4 is adequate for many applications. In other applications, the pulley ratio may be tuned to achieve other proper baseline torques, as understood by those of ordinary skill in the art. This in turn, may allow for some embodiments (e.g., test apparatus, systems, methods, and the like) discussed below capable of emulating natural terrains for many different tracked vehicles.

The test system 100 of FIG. 1 includes a mounting frame 40, a belt 50, and result logic 60. The mounting frame 40 is used to rigidly mount a first vehicle 20 that is under test within the mounting frame 40 and to rigidly mount a second dynamometer vehicle 30 within the test frame 40. In some embodiments, the mounting frame 40 is formed with ridged material so that bodies of the first vehicle 20 under test and the second vehicle 30 essentially do not move with respect to each other, except when the upper mounting frame 42 is rotated with respect to the lower mounting frame 44 about a pivot point PT1 as discussed below. The vehicles 20, 30 may be retained within the mounting frame 40 using any combination of clamps formed of metal, wood, wood formed with notches to accept various portions of vehicle involved in a test, or the use of another material, straps, elastic cords or other suitable devices as understood by those of ordinary skill in the art to retain the vehicles 20, 30 within the mounting frame 40.

Mounting vehicles involved in the test in a mounting frame may have multiple improvements when testing robots. For example, it may provide the ability to adjust the torque and speed of rotation on the robot dynamometer (the robot recreating the test environment conditions). No modifications to the robot axle or wheel locking mechanism may be required as the same spline, lock ring, and width of the robot's wheel may be used. Levers or other devices may allow variable adjustment of robot separation distance to allow tensioning of the belt. This arrangement yields the benefits of: the ability to achieve baseline torque of single robot track, the ability to simulate all natural terrains with greater accuracy, no or reduced robot track slippage, no or reduced generation of side-to-side movement during operation, reduced vibration, and the dynamometer vehicle remains stationary during operation, eliminating need for pinning the dynamometer (second) vehicle in the mounting frame 40 with boards or other fasteners as in prior art systems.

"Rigid material" is defined herein as any material that retains its shape when formed and that is not a liquid or a gas. Rigid material may be pre-formed into specific shapes such as C-channel, box-channel, as well as square and/or rectangular tubing. For example, rigid materials include metal steel, aluminum, plastics, wood, etc.

"Rigidly connected" or "rigidly mounted" is defined herein to mean that two or more materials are connected together by welding, bolts, glue, clamps and/or connected together in another way as understood by a person with ordinary skill in the art so that the connected components essentially do not move relative to each other.

In some embodiments, the belt 50 is configured to be rotatably attached to a rotational drive component 22 (pulley, axle, and the like) of a propulsion system 24 of the first vehicle 20 and to a rotational drive component 32 of a propulsion system 34 of the second vehicle 30. The belt 50 may be any suitable belt and may be formed with petroleum and/or fabric materials as understood by those of ordinary skill in the art. In some configurations, the belt 50 may be attached to pulleys attached to the rotational drive component 22 of the propulsion system 24 of the first vehicle 20 and to the rotational drive component 32 of the propulsion system 34 of the second vehicle 30. Preferably the belt 50 will have an adequate tension and a coefficient of friction so that there is less than an undesirable amount of slippage between the belt 50 and the rotational drive components 22, 32. The mounting frame 40 may include an upper frame 42 and a lower frame 44 that pivot relative to each other about a pivot point PT1. The pivot point PT1 allows the belt 50 wrapped around pulleys/drive components 22, 32 to be adequately tightened when the upper frame 42 and the lower frame 44 that may be pivoted with respect to each other in the directions of arrow A.

The test system 100 includes one or more measurement devices 70 attached to the second vehicle 30. The measurement device 70 may be a dynamometer used to measure a torque associated with the rotational drive component 22 of a propulsion system 24 of the first vehicle 20. In some embodiments, the measurement device 70 may record other parameters associated with the first vehicle 20 such as torque, rotational/angular speed, rotational/angular momentum, force, battery power, voltage, current, and other desirable characteristics that may be of interest in evaluating the performance of the first vehicle 20 when it is under test.

The result logic 60 is used to determine if the first vehicle 20 under test passed the propulsion test based, at least in part, on an analysis of the at least one parameter. The result logic 60 generates an indication if the first vehicle under test 20 passed or failed the propulsion test. For example, the result logic 60 may illuminate a green light emitting diode (LED) or another light when the first vehicle 20 passes a test and illuminates a red LED or light when it fails a test. In other example embodiments, a pass/fail indicator may be displayed on a graphical user interface (GUI) on a computer screen, handheld electronic device, or another device as understood by those of ordinary skill in the art.

"Processor" and "Logic", as used herein, includes but is not limited to hardware, firmware, software and/or combinations of each to perform a function(s) or an action(s), and/or to cause a function or action from another logic, method, and/or system. For example, based on a desired application or needs, logic and/or processor may include a software-controlled microprocessor, discrete logic, an application specific integrated circuit (ASIC), a programmed logic device, a memory device containing instructions or the like. Logic and/or processor may include one or more gates, combinations of gates, or other circuit components. Logic and/or a processor may also be fully embodied as software. Where multiple logics and/or processors are described, it may be possible to incorporate the multiple logics and/or processors into one physical logic (or processors). Similarly, where a single logic and/or processor is described, it may be possible to distribute that single logic and/or processor between multiple physical logics and/or processors.

The test system 100 of FIG. 1 includes several benefits over prior art systems. For example, the test system 100 reduces vibration and slip caused by the propulsion system interfaces (track-to-track interface) between the vehicles 20, 30. Additionally, the test system 100 provides for dynamic profiles by using two independent computer-controlled DC programmable load banks for the left-side and the right-side propulsion mechanisms (e.g., tracks) of the first vehicle 20 under test. The test system 100 also uses current/electrical power to control those tracks instead of adjustable resistor banks. The test system 100 can also provide for computer control of the speed of the first vehicle 20 under test to allow for simulation of the vehicle's terrain response based, at least in part, on original user's XBOX 360 controller speed inputs. In other configurations, the test system 100 may also capture synchronous battery (BB-2590) internal SMBus data using isolators allowing for battery usage and other characteristics relative to a repeatable profile.

Figure 2:
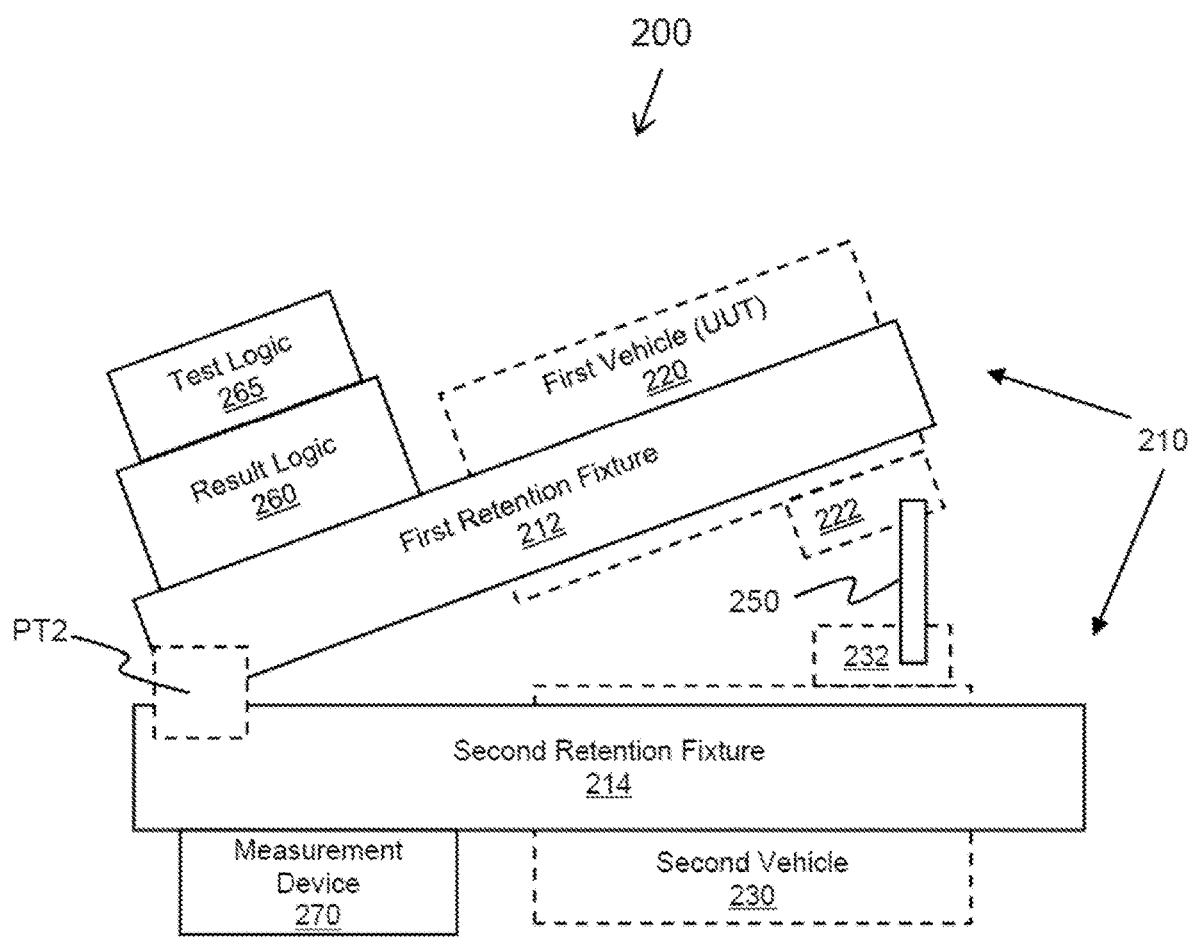
FIG. 2 illustrates another embodiment of a test system that tests a maneuverability of a propulsion system.

FIG. 2 illustrates another embodiment of a test system 200 for testing a propulsion system that has additional useful features and components. First, all the key components of FIG. 2 are introduced with their functionality and then they are discussed in detail. A retention fixture 210 includes a first retention fixture 212 and a second retention fixture 214. A first vehicle 220 under test is configured to be mounted to the first retention fixture 212 and a second vehicle 230 is configured to be mounted to the second retention fixture 214. The first and second vehicles 220, 230 are rigidly mounted so that frames/bodies of those two vehicles essentially do not move with respect to each other. A linking device 250 links a propulsion speed of a propulsion system 222 of the first vehicle 220 to a propulsion system 232 of the second vehicle 230. A test logic 265 controls at least the propulsion system of the second vehicle 230 to subject the first vehicle 220 to a propulsion test. A measurement device 270 measures at least one measurable parameter associated with the propulsion system 222 of the first vehicle 220 while the first vehicle 220 is being subjected to the propulsion test. A result logic 260 determines if the first vehicle 220 under test passed the propulsion test based, at least in part, on an analysis of the at least one measured parameter. The result logic 260 further generates an indication if the first vehicle 220 under test passed or failed the propulsion test.

Figure 3:
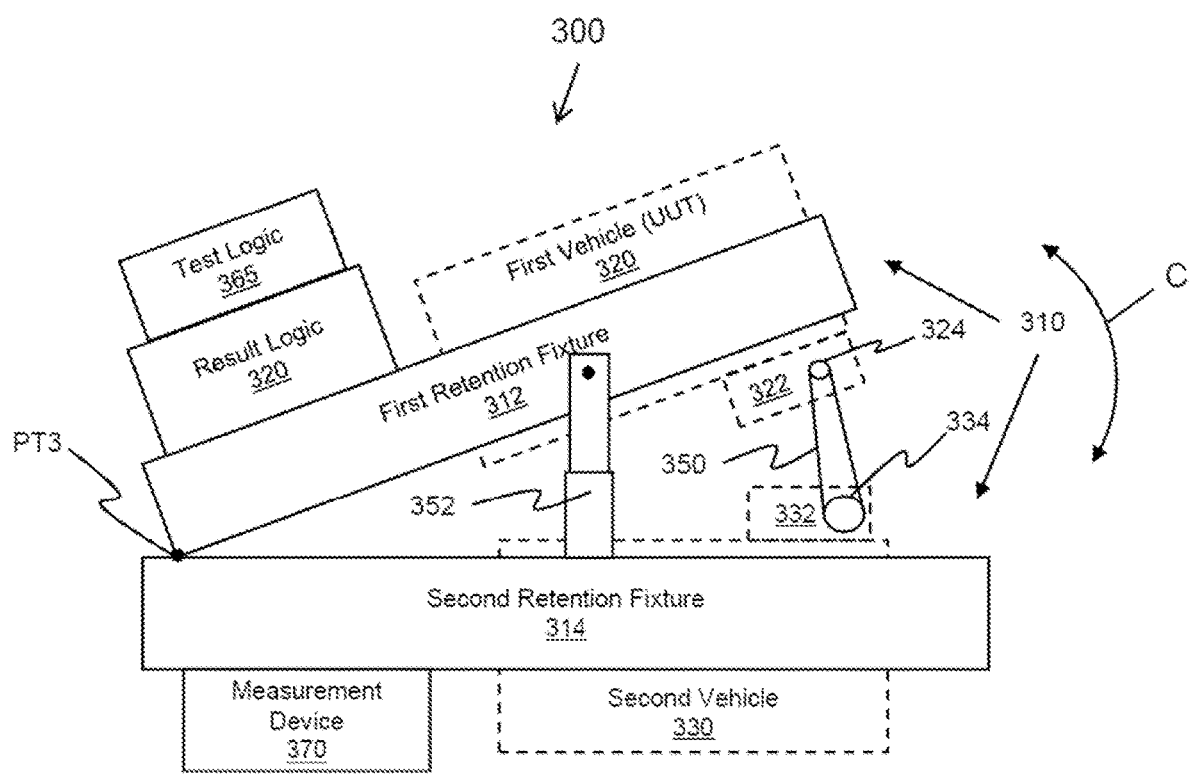
FIG. 3 illustrates another embodiment of a test system that tests a propulsion system.

In another configuration and as illustrated in FIG. 3, the test system 300 includes some components similar to the test system of FIG. 2 including: a retention fixture 310 that includes a first retention fixture 312 and a second retention fixture 314. Similar to FIG. 2, a first vehicle 320 under test is mounted to the first retention fixture 312 and a second vehicle 330 is mounted to the second retention fixture 314. The first and second vehicles 320, 330 are rigidly mounted so that frames/bodies of those two vehicles essentially do not move with respect to each other. The vehicles 320, 330 each, respective have a propulsion system 322, 332 with a pulley attached to each propulsion system 322, 324, as illustrated. A belt 350 is connected to each of the pulleys, 324, 334. A test logic 365 controls at least the propulsion system of the second vehicle 330 to subject the first vehicle 320 to a propulsion test. In some embodiments, the first pulley 324 has a smaller diameter than the second pulley 334. For example, a circumference size ratio between the first pulley 324 and the second pulley 334 is, respectively, between the ratio of 1:8 and a ratio of 1:2 or may be another desired ratio.

Similar to the test system of FIG. 2, a measurement device 370 measures at least one measurable parameter associated with the propulsion system 322 of the first vehicle 320 while the first vehicle 320 is being subjected to the propulsion test. The measurement device 370 may measure battery voltage, bus voltage, battery current, motor current, battery temperatures, ambient temperature, torque, torque request signals, motor drive current monitor signals, a rotational speed and/or another desired parameter. As discussed above, a result logic 360 determines if the first vehicle 320 under test passed the propulsion test based, at least in part, on an analysis of the at least one measured parameter. The result logic 360 further generates an indication if the first vehicle 320 under test passed or failed the propulsion test.

In at least one configuration, the first retention fixture 312 and the second retention fixture 314 may be moved toward or away from each other in the direction of arrows C to allow for a tension applied to the belt 350 to be increased or decreased. For example, the two retention fixtures 312, 314 may rotate about pivot point PT3 to provide a desired tension on the belt 350. Alternatively, a ratchet type of mechanism may be used to ratchet the first and second retention fixtures 312, 314 away from each other to increase an engagement between the two propulsion systems. The improved test system may allow for even belt tension on the right-side and left-side track pulleys 324, 334. When the desired belt tension is achieved, the belt spacing may be held in place by a telescoping arm 352 or a similar device to retain that tension.

In some configurations the propulsion system 322 of the first vehicle 320 further comprises a first motor and the propulsion system 332 of the second vehicle 330 further comprises a second motor. The propulsion system 322 of the first vehicle 320 may be identical to the propulsion system 332 of the second vehicle 332. In some configurations, the first vehicle 320 and the second vehicle 330 may be powered by a battery power supply and/or a fuel cell power supply. In yet other configurations, a controller logic dynamically controls the propulsion system of the second vehicle 330. In other configurations, during testing, the controller logic controls left and right propulsion systems of the second vehicle 330 and may control the left-side propulsion systems of the second vehicle 330 operating independently of a right-side propulsion systems of the second vehicle 320. The propulsion systems 322, 332, may rotate one or more tracks driven by the first and/or second vehicle 320, 330 that may be robots propelled over surfaces with continuous types of tracks moving over surfaces.

It is useful to generate torque values below the combined torque of two tracks on a dual track propelled robot. Robot/vehicle tests with a track-to-track interface and a one-to-one ratio of the two track sprockets are unable to generate torque values below the combined torque of two tracks. This prevented simulation of certain natural terrains. However, the test systems 100, 200, 300 of FIGS. 1-3 may simulate robot track free-floating torques. The ratio of the first vehicle (robot) to dynamometer (second vehicle) profile can be selected to allow for a reduction in speed to allow for a corresponding reduction in torque. Thus, the embodiments of FIGS. 1-3 replace the track-to-track interface with a belt and pulley system (or other reduction system) that allows for a reduction in torque through pulley ratios/propulsion system component ratios. For example, the test systems 100, 200, 300 of FIGS. 1-3 may use a pulley ratio of around 1:4, but this can be tuned as necessary to achieve proper baseline torques. This in turn provides the test systems of FIGS. 1-3 the capability of simulation a wide variety of natural terrains.

In at least one configuration of the test systems of FIGS. 1-3, the electrically coupled adjustable electrical resistance was replaced by two independent and computer-controlled DC programmable load banks (left-side and right side track). The DC load banks were additionally controlled using current or power control in lieu of resistance control. A diode bridge may be used between each robot dynamometer motor and each independent DC Load Bank to force the polarity of the motor voltage to remain positive whether the robot track was moving forward or reverse. This allows simulation of both forward and reverse conditions within the same profile as well as allows for turn-in-place scenarios where one track is moving forward and one is moving in reverse.

Independent programmable DC Load Bank outputs may be synchronized via use of computer control software, so that the left-side track and right-side track input load profiles would start at the same moment in time to allow more natural simulation of the robot as if it were on real terrain. The use of the computer-controlled DC Load Banks allows for input of repeated profiles with current or power values updated at up to 10 times per second and allows for tuning of load inputs to each independent track side. Two independent computer-controlled power supplies could also be added to the system to allow the simulation of events where the robot would be motoring to reduce speed (regenerative braking conditions), such as on down-hill inclines. The independent programmable DC Load Bank outputs may be synchronized via use of computer control software, so that the left-side track and right-side track input load profiles would start at the same moment in time to allow more natural simulation of the robot as if it were on real terrain.

Adjustable resistance loads may not adequately duplicate field conditions because they are incapable of generating dynamic profiles and there the right-side and left-side track profiles of tracked vehicles may not be synchronized. However, the test systems of FIGS. 1-3 provide for dynamic profiles through the use of two computer-controlled, independent DC programmable load banks for both the left-side and right-side tracks. Additionally, these systems use current and power to control the propulsion systems/tracks as opposed to resistance. These configurations of the test systems additionally allow for computer control of the speed of the robot (or vehicle) to allow for simulation of not only the robot's terrain response but also, in some embodiments, eventually the original user XBOX 360 controller speed inputs. Computer control software may be developed and used to maintain fixed robot speed in lieu of direct user control via XBOX 360 game controller, to eliminate variability. Additionally, the software provides the ability to later allow for the feeding of robot speed profiles from real user data synchronized to the left side and right side track DC load bank input profiles.

Additionally, the belt & pulley test systems 100, 200, 300 of FIGS. 1-3 cause less vibration and less slip than previous track-to-track interface test systems that created significant movement side-to-side when the robot was operated, particularly in turns, such that the rig would have to be constrained by boards to restrict its movement around in the thermal chamber. The new system does not exhibit any real movement during simulations and reduces vibration and slip on the dynamometer (second vehicle) rig caused by track-to-track interfaces.

In some embodiments of the improved robot (vehicle) dynamometer test system of FIGS. 1-3, individual BB-2590 battery SMBus data signals may be broken out from the robot battery cradle using an in-line BB-2590 strap-on interface. Capturing synchronous BB-2590 battery internal SMBus data using isolators may allow for analysis of battery usage and characteristics relative to a repeatable profile. Signals may be acquired from each individual 12-V section within each BB-2590 battery (there are two 12-V battery sections per BB-2590) through the use of I2C isolators and I2C converters. These signals were input into the a same computer controlling the programmable DC Load Banks and the battery internal data was recorded and synchronized against the running DC Load profiles.

Some of the configurations provide other useful components and features. For example, because the example test systems are of relatively small size, they may be used to test vehicles within a climate chamber. The test system may be placed inside the climatic chamber so that the first vehicle under test can be tested with different temperatures, weather conditions and/or other environmental conditions. Validation testing can be conducted on the vehicles using the test systems of FIGS. 1-3 to ensure correct functionality. Another useful feature is that the torque request and motor controller signals may be captured from the robot controller boards to allow the development of transfer functions and equations that can resolve a torque input profile into separate and tuned DC load bank current or power profiles for each side of the robot dynamometer under test (first vehicle). In some configurations, the pulleys may be 3D-printed with a spline matching of the robot's own track wheels allowing connection to the robot using the robot's own axle and wheel locking mechanism. A belt may also be sized to a length to match the combined pulley circumferences and a distance between robot and dynamometer (first and second vehicle) motors.

Figure 4:
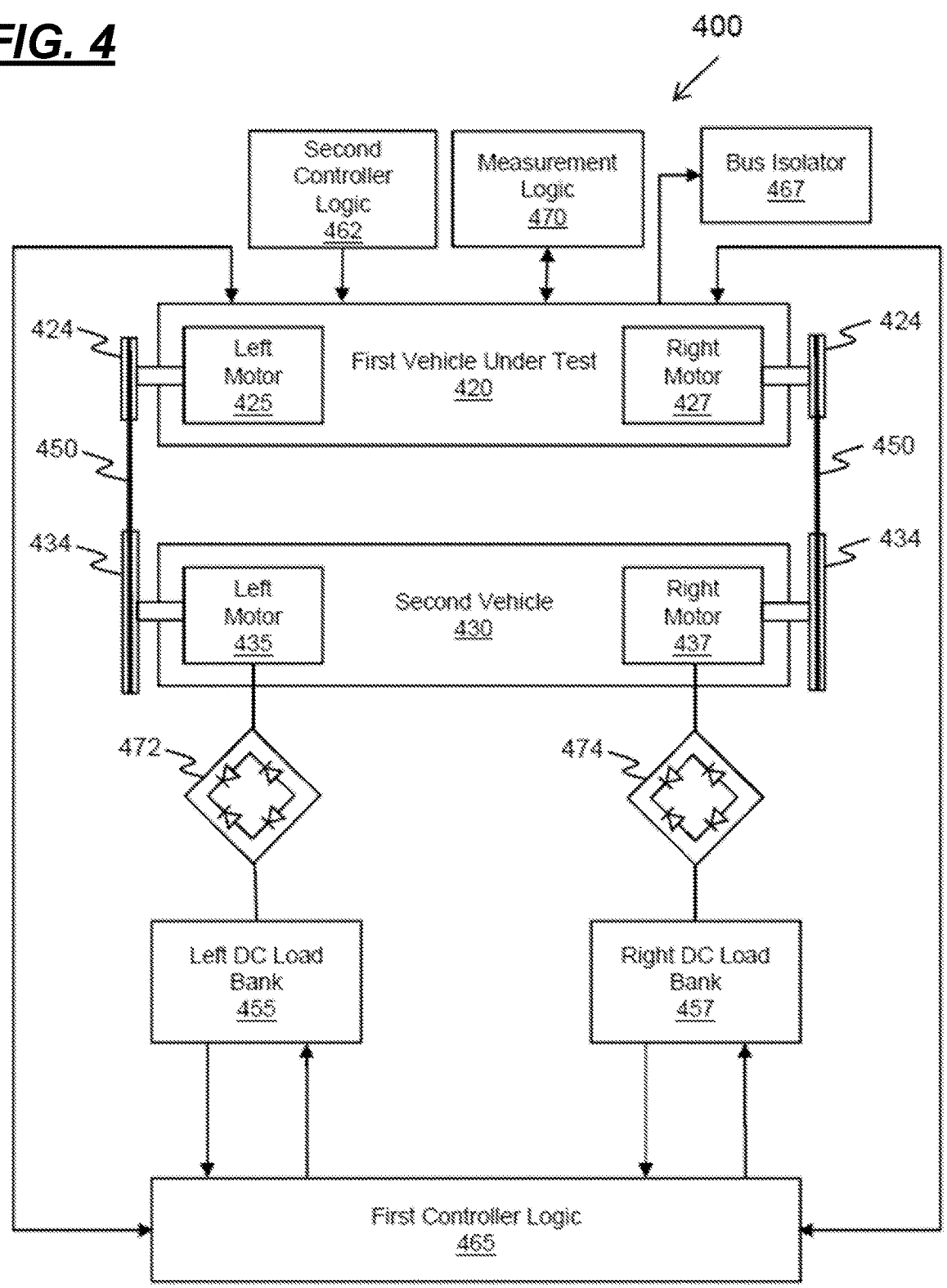
FIG. 4 illustrates another embodiment of a partial schematic of test system that tests a propulsion system.

FIG. 4 illustrates an example partial schematic 400 illustrating some of the key functional components of an example test system. FIG. 4 illustrates some features, operations, systems, and the like of FIGS. 1-3 discussed above. Similar to some of the above figures and discussions, the schematic 400 includes first and second vehicles 420, 430, as well as pulleys 424, 434 and belts 450. The pulleys 424, 434 and belts 450 are shown connected on both sides of the vehicles 420, 430, but in some embodiments, they may be connect to one side of the vehicles 420, 430. Similar to the above Figures, the schematic diagram also includes a measurement device 470.

The example vehicles of FIG. 4, that may be robots with tracks removed, and may have propulsion systems with drive trains (not shown) and/or motors 425, 427, 435, 437 and drive shafts that ordinarily drive disks that propel endless tracks. However, when the first vehicle 420 is under test, its shafts are connected to pulleys 424 and the pulleys are coupled together with belts 450, as illustrated. The motors 425, 427, 435, 437 are electrical motors and may be driven by batteries such as a BB-2590 battery or the like. In some configurations, the batteries may, or other power supply, may be in parallel with the DC load banks to drive the second vehicle motoring and drive the motors 435, 437 of the second vehicle 430, in parallel with the left DC load bank 480 and a right DC load bank 482, through diode bridges 472, 474 or drive the motors 435, 437 in another way as understood by those of ordinary skill in the art. The DC load bank may operate during the second vehicle motor generating event only.

The example schematic 400 of a test system further includes a controller logic 465, a second controller logic 462, and a bus isolator 467. Of course some of these blocks may be merged together and/or separated out into multiple other individual blocks. In some embodiments, the first controller logic 465 is configured primarily to control and monitor the left DC load bank 455 and the right DC load bank 457. These DC load banks 455, 457 drive the second vehicle 430 through the diode bridges 472, 474. The first controller logic 465 may drive electrical signals and/or torque signals based on transfer function(s) derived from signals earlier captured from robot controller boards. These electrical signals may, based on the transfer function(s), resolve a torque input profile into separately tuned DC load bank current or power profiles for each side of the robot dynamometer (first vehicle) under test.

In some configurations, the second controller logic 462 may monitor the first vehicle under test and provide some of those signals back to the first controller logic 465 and/or a result logic to determine, at least in part, if the first vehicle under test 420, has passed or failed a test. In some embodiments, the second controller logic 462 may also be connected to an XBOX 360 or similar type of controller and collected user provided inputs. Based on those user inputs, the second controller logic 462 may provide for, via the first controller logic 465, simulation of the vehicle's terrain response based, at least in part, on original user's XBOX 360 controller speed inputs.

In some embodiments the bus isolator 467 may be connected to the battery of the robot (first vehicle under test 420). For example it may monitor individual BB-2590 battery SMBus data signals broken out from the robot battery cradle using an in-line BB-2590 strap-on interface. As mentioned above, capturing synchronous BB-2590 battery internal SMBus data using isolators allows for analysis of battery usage and characteristics relative to a repeatable profile. Signals may be acquired from each individual 12-V section within each BB-2590 battery through the use of I2C isolators and I2C converters. These signals are then input into the first controller logic 460 controlling the programmable DC Load Banks 455, 457.

FIGS. 8A-D illustrate another embodiment of a test system 800 for testing a propulsion system that may test the propulsion system(s) of a vehicle that may be a robot, or another vehicle independently. In this embodiment, the second dynamometer robot has been eliminated except for its motors 832A, 832B and/or axle. In other configurations, even these motors may be replaced with a representative propulsion system, or motor, that is different from the original motors of the original dynamometer robot. As illustrated, two test propulsion systems 823A, 823B may be used to test two motors in a robot 820 (or other vehicle) under test.

Similar to the above embodiments, the embodiments of FIGS. 8A-D include a retention fixture 810. The retention fixture 810 is a single retention fixture 810 to provide support for the robot (or any vehicle) under test 820 as well as test propulsion systems 832A, 832B (dynamometers) used to test two motors 822A, 822B of the robot under test 820. The vehicle under test 820 is configured to be mounted onto mounting brackets 813A-D of the test fixture 810 so that it is rigidly attached to the test fixture 810. The mounting brackets 815A-D may be locatable within the test fixture 810 to accommodate vehicles/robots of various sizes. In the example figures of this embodiment, two propulsion systems 832A, 832B are mounted in the test fixture 810. Rigid brackets 816A-D are pivotably mounted to pivotable mounting brackets 815A-D attached to the test fixture 810, as illustrated, so that the pivotable mounting brackets 815A-D pivot about pivot points PPA-D. Tensioning devices 852A, 852B may be used to rotate the supported test motors/dynamometers 832A, 832B about the pivot points PPA-D to place a desired tension on linking belts 850A, 850B (discussed below) so that the test motors/dynamometers 832A, 832B are adequate coupled to the motors 822A, 822B of the robot 820, or other vehicle.

A first test pulley 824A is attached to the first motor 822A (or axle end or propulsion system) of the robot under test 820 and another second test pulley 824B is attached to the second motor 822B (or axle end or propulsion system) of the robot under test 820. A first dynamometer pulley 834A is attached to the first propulsion device (e.g., motor) 832A and a second dynamometer pulley 834B is attached to the second propulsion device (e.g., motor) 832B. A first belt (e.g., linking device 850A) is installed around the first test pulley 824A and the first dynamometer pulley 834A. Similarly a second belt (e.g., linking device 850B) is installed around the second test pulley 824B and the second dynamometer pulley 834B.

The embodiment illustrated in FIG. 8 may have similar test logic, measurement device(s) and other associated components and systems similar to those discussed in the above embodiments. For the sake of brevity and clarity, these are not fully, repeatedly discussed here. For example, test logic may control first and second propulsion devices (e.g., motor) 832A, 832B to subject the test vehicle 820 to a propulsion test. A measurement device may measure at least one measurable parameter associated with the first motor 822A (or axle end or propulsion system) and/or the second motor 822B (or axle end or propulsion system) of the vehicle under test 820 while the vehicle 820 is being subjected to the propulsion test. A result logic may determine if the first vehicle under test 820 passed the propulsion test based, at least in part, on an analysis of the at least one measured parameter. The result logic may further generates an indication if the vehicle under test 820 passed or failed the propulsion test.

Figure 5:
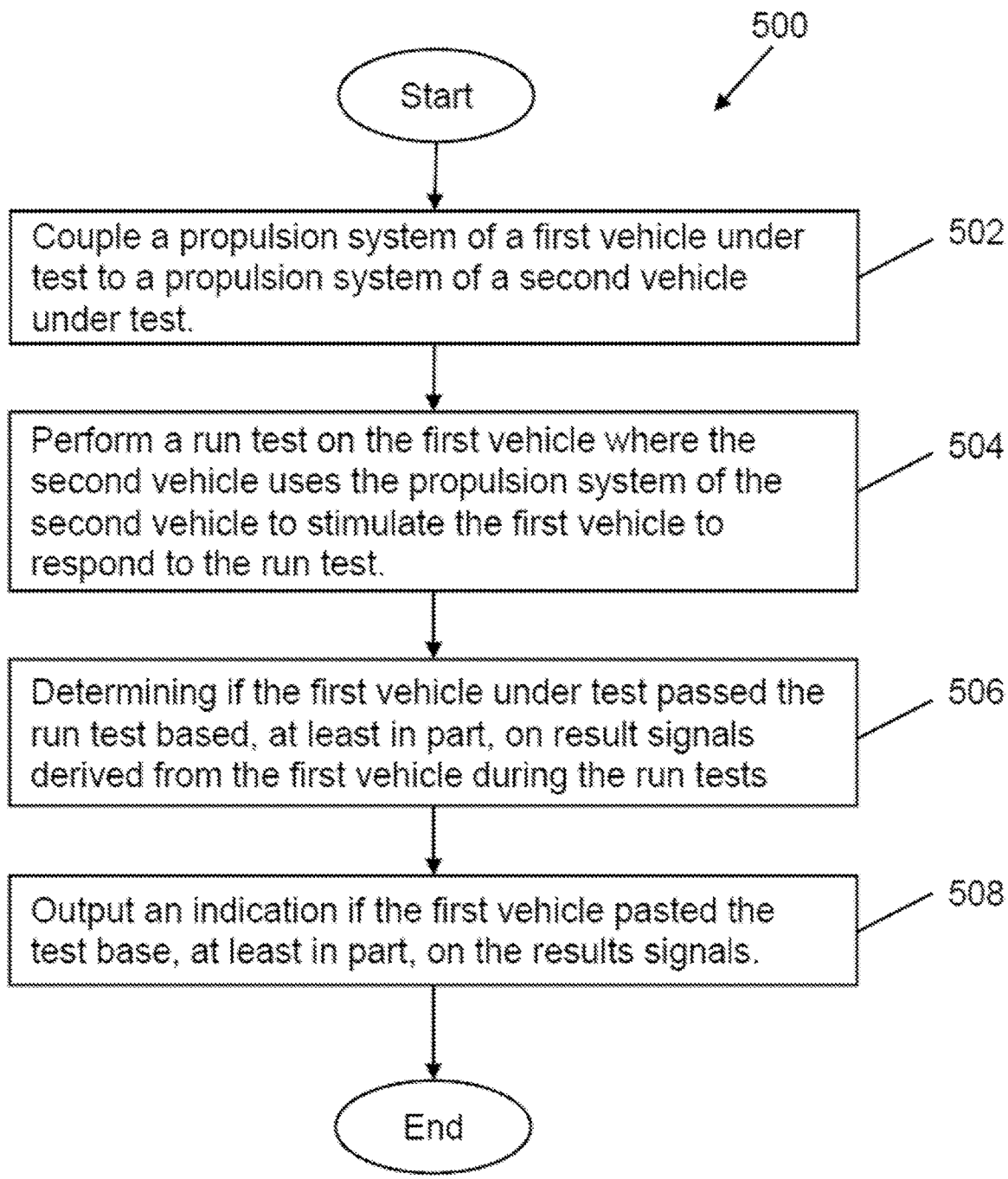
FIG. 5 illustrates a flow of a method for testing the propulsion system of a vehicle.

FIG. 5 illustrates some example actions of a method 500 of testing a vehicle in a stationary test frame without requiring the vehicle leave the test frame and drive a testing course. The method 500 begins by coupling a propulsion system of a first vehicle under test to a propulsion system of a second vehicle, at 502, so that a speed of the propulsion system of the second vehicle is reduced compared to a speed of the first vehicle. As discussed above, if these are tracked vehicles, the tracks may be removed and pulleys may replace rotating gears used to move the tracks. The gears may be sized to change the speed of the first vehicle under test with respect to the second vehicle. A run test is performed on the second vehicle, at 504, where the second vehicle uses the propulsion system of the second vehicle to simulate the first vehicle to respond to the run test. The run test was derived from values associated with a test run of a separate baseline vehicle navigating a test track using the propulsion system of the baseline vehicle. The stimulation of the first vehicle by the second vehicle based on the run test derived from the baseline vehicle causes the first vehicle to respond to the testing conditions generated by the test track.

A determination is made, at 506, to determine if the first vehicle under test passed the run test. This results is based, at least in part, on result signals derived from the first vehicle during the run test. For example, some of the result signals may be torques applied to specific drive train or propulsion system components that may be measured. A determination may be made if these values are within correct ranges at different times during the test. An indication if the first vehicle passed the test is determined, at 508, based, at least in part, on the result signals.

The method 500 may further capture torque request and motor control signals from the baseline vehicle and the run test may then be based, at least in part, on torque request and motor control signals translated into current and power profiles for each side of the second vehicle. Furthermore, two DC programmable load banks may be used in combination to drive two independent and separate motors on each side of the second vehicle according to a function based, at least in part, on the current and power profiles.

The method 500 may include the action of simulating several natural terrains where the torque request signal is on average less than the torque required to spin two robot tracks in direct contact with one another. In an alternative configuration, the method 500 may utilize two computer-controlled, independent DC programmable load banks for both a left-side track and a right-side track of the second vehicle. The test can then be performed based on the computer-controlled, independent DC programmable load banks independently controlling each side of the second vehicle when testing the first vehicle under test during the testing process.

Figure 6:
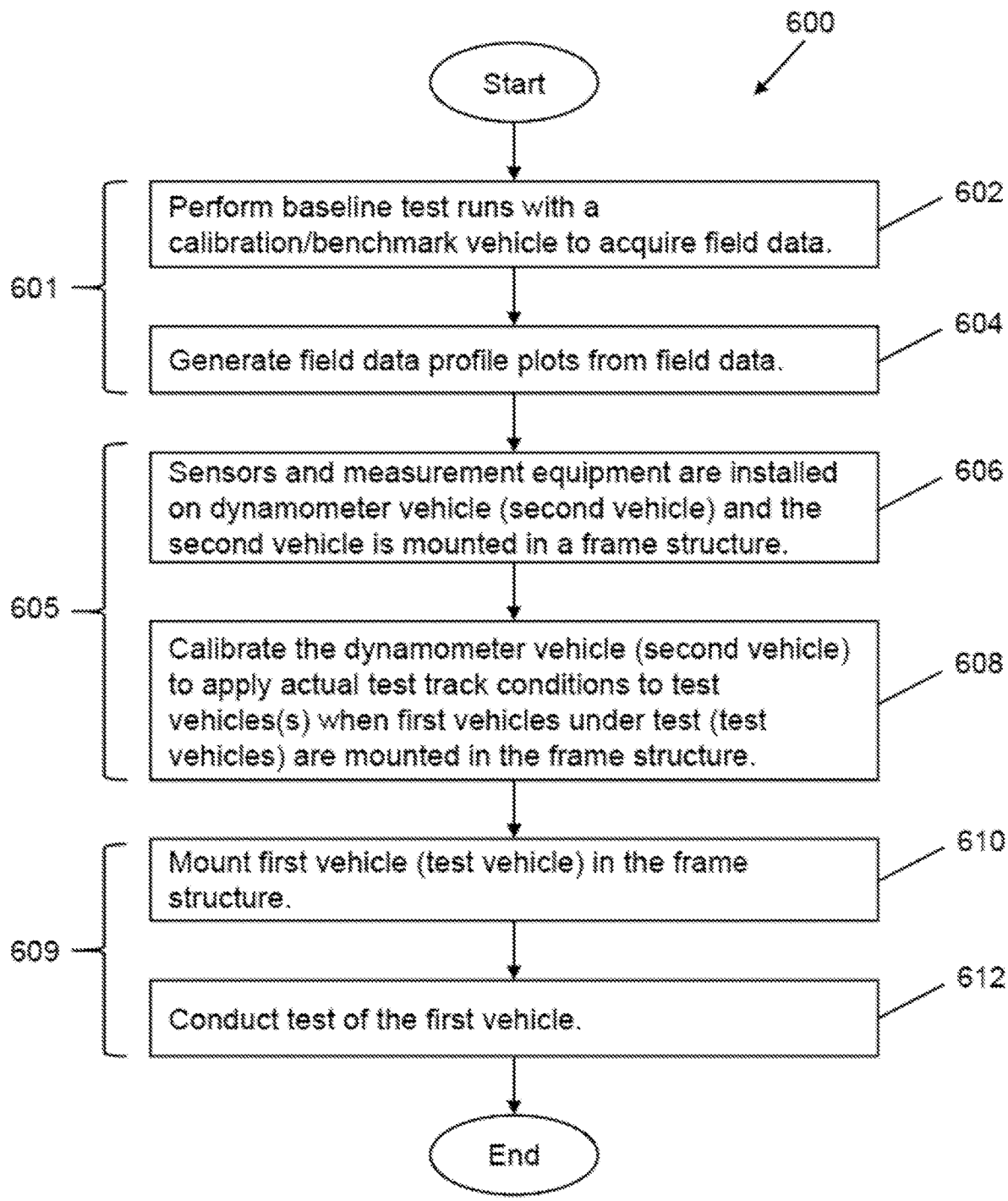
FIG. 6 illustrates a flow of another method for testing the propulsion system of a vehicle.

FIG. 6 illustrates some example actions of a method 600 of testing a mobile vehicle. The method 600 may be implemented in connection with the test systems of FIGS. 1-3 discussed above to determine and regenerate (e.g., produce, provide, and the like) vehicle operational conditions that simulate field (e.g., real world, typical environment, etc.) testing conditions in connection with one or more of the test system of FIGS. 1-3. In general, the method 600 is generally conducted (e.g., performed execute, carried out, etc.) via the test systems of FIGS. 1-3 and related electrical apparatuses to emulate measured and recorded field data in a laboratory and/or an environmental control chamber that uses the variable load settings to conduct temperature and environmental cycle testing.

The process 600 comprises three phases (i.e., stages, sections, segments, portions, steps, etc.): a first phase 601 for generating field data at a test track using a calibration/baseline vehicle, a second phase 605 for preparing a second vehicle (dynamometer vehicle) for testing a first vehicle under test (test vehicle), and a third phase 609 for actually testing one or more first vehicles under test (test vehicles). Phases 601, 605, and 609 are generally serially linked (i.e., performed, conducted, executed, etc.) in order of performance. That is, upon completion of first phase 601, flow enters phase 605. At the completion of the phase 605, the method 600 transitions to the third phase 609. After the first phase 601 and the second phase 605 have been performed, the third phase 609 may be performed any number of times on any desired number of first vehicles under test before the method 600 ends.

The first phase 601 generally includes measuring field test data under various predetermined conditions on the calibration/baseline vehicle. The first phase 601 may begin by performing baseline test runs, at 602, with a calibration/baseline vehicle to acquire field data. Field data acquired may include: battery voltages, bus voltages, battery currents, motor currents, battery temperatures, ambient temperature, motor drive torque request signals, motor drive current monitor signals and motor speeds (rotation time). A high performance field programmable gate array (FPGA) and real time controller data acquisition may be used to directly measure the motor drives (PWM). Samples may be collected at high frequency (up to 850 kHz) and input into a signal averaging function producing 100 Hz data.

Field data profile plots are generated, at 604, from field data. This may include generating a torque voltage request profile for both the left and right side propulsion elements when the calibration/baseline vehicle is propelled from devices on its left and right sides. When the calibration/baseline vehicle is a track propelled robot, for example, this may include generating the torque voltage request profile from direct measurement of a robot control board signal.

The second phase 605 generally includes the method 600 setting up the test system for performing measurements on the second vehicle (dynamometer vehicle) for preparing a second vehicle (dynamometer vehicle) for testing a first vehicle under test. The measurements may comprise motor current, voltage, and temperature and other measurements collected during the first phase 601. Sensors and measurement equipment are mounted on the dynamometer vehicle (second vehicle) and the second vehicle is mounted in frame structure, at 606. The dynamometer vehicle (second vehicle) is calibrated, at 608, to apply actual test track conditions to test vehicles when first vehicles under test (test vehicles) are mounted in the frame structure. The DC load bank computer control software may independently control the left side and right side track of the robot (second vehicle) and output a time-based current load profile on both tracks to produce a corresponding torque voltage request profile (left and right side tracks) from a direct measurement of the robot control signal. A transfer function/equation is also generated relating DC load bank current input to robot track torque voltage request signal values over a torque range of the robot (both left side and right side). In other example configurations, the robot left-side and right-side track real world terrain torque request signal profiles may be converted into DC load bank current profiles.

The third phase 609 measures the performance (maneuverability, propulsion, and the like) of the test vehicle and records the desired test data. Generally, the dynamometer testing that is performed on the first vehicle under test (test vehicle) is conducted in a climatic test chamber such that various environmental conditions may be implemented. In particular, the third phase 609 includes mounting the first vehicle (test vehicle) in the frame structure, at 610, and testing of the first vehicle is then conducted, at 612. In other embodiments, computer control software and independent DC programmable load banks may be used to replicate the DC load bank current profiles at update rates as desired. Optionally, battery data may be used to generate new battery management control algorithms for repeated testing on the robot dynamometer (second vehicle) for making design improvements.

Figure 7:
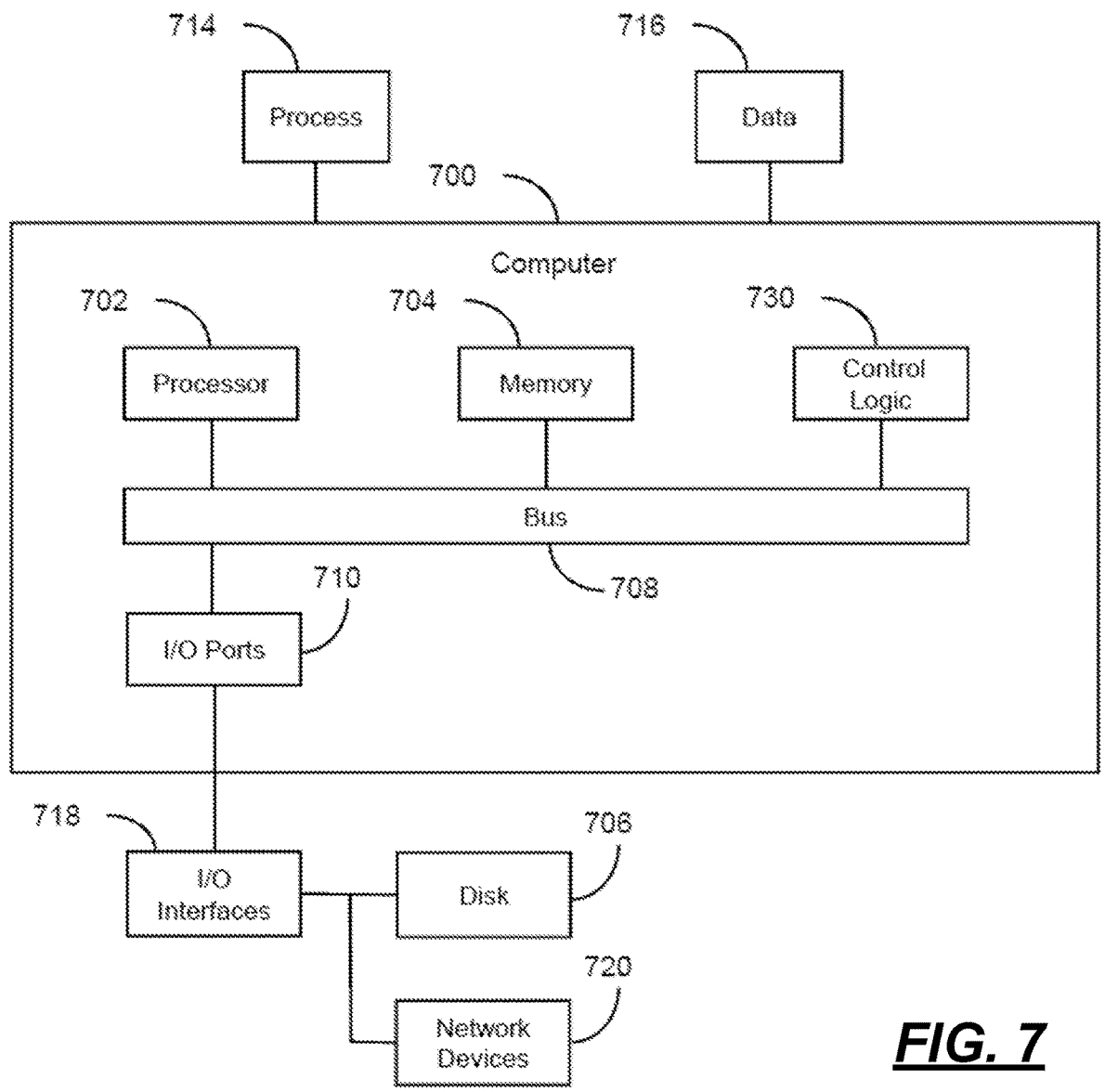
FIG. 7 illustrates an example view of an embodiment of a computer system.
Figure 8A:
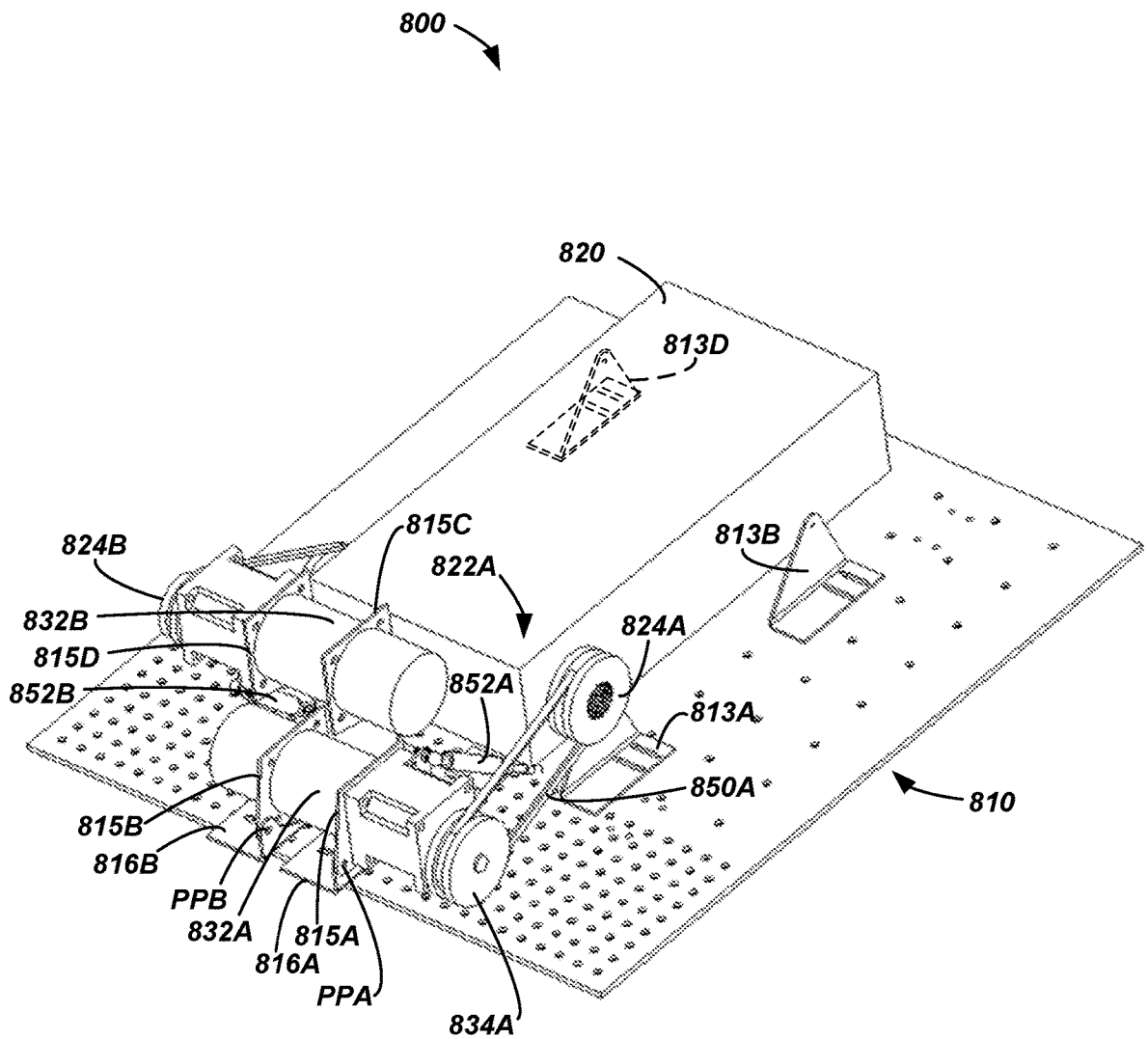
FIGS. 8A-D illustrates another embodiment of a test system that tests a propulsion system.
Figure 8B:
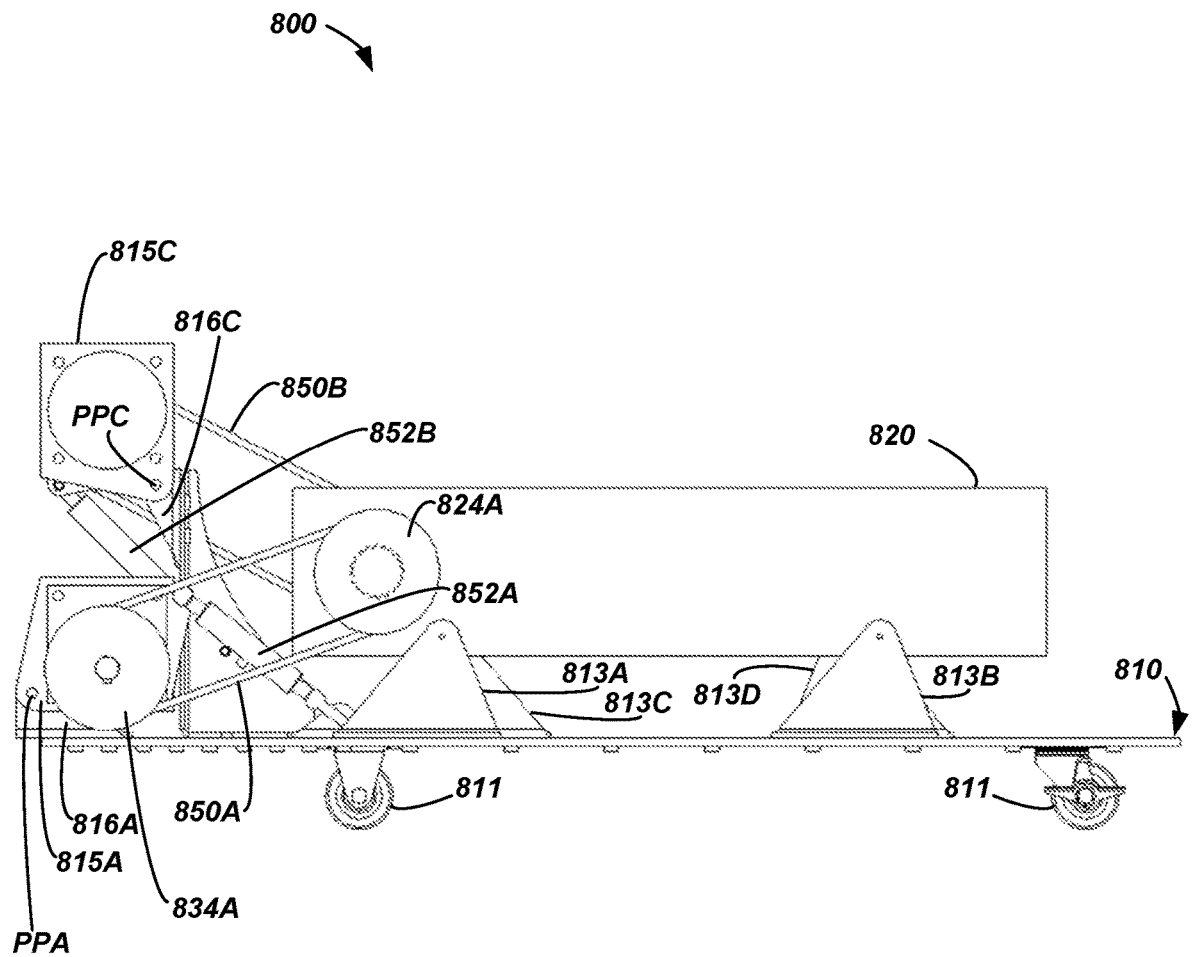
Figure 8C:
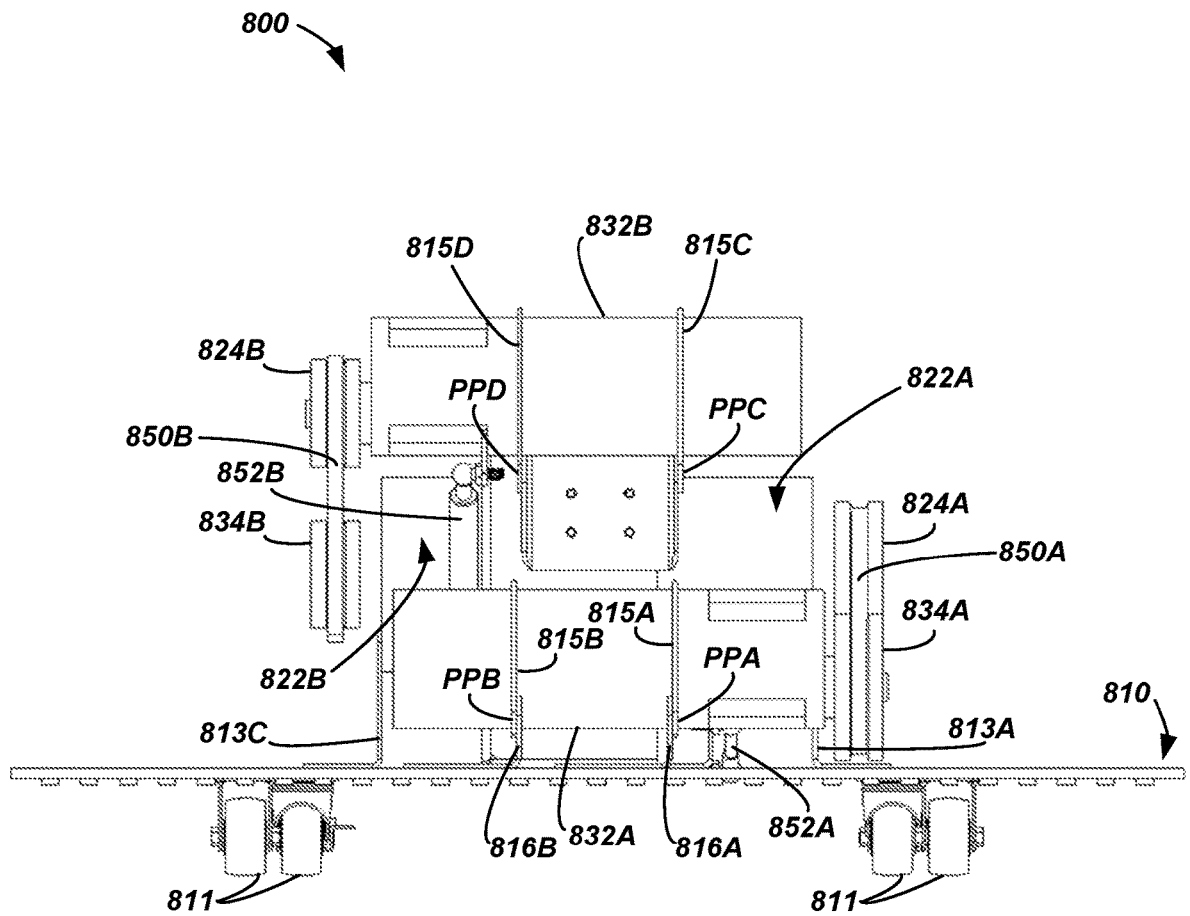
Figure 8D:
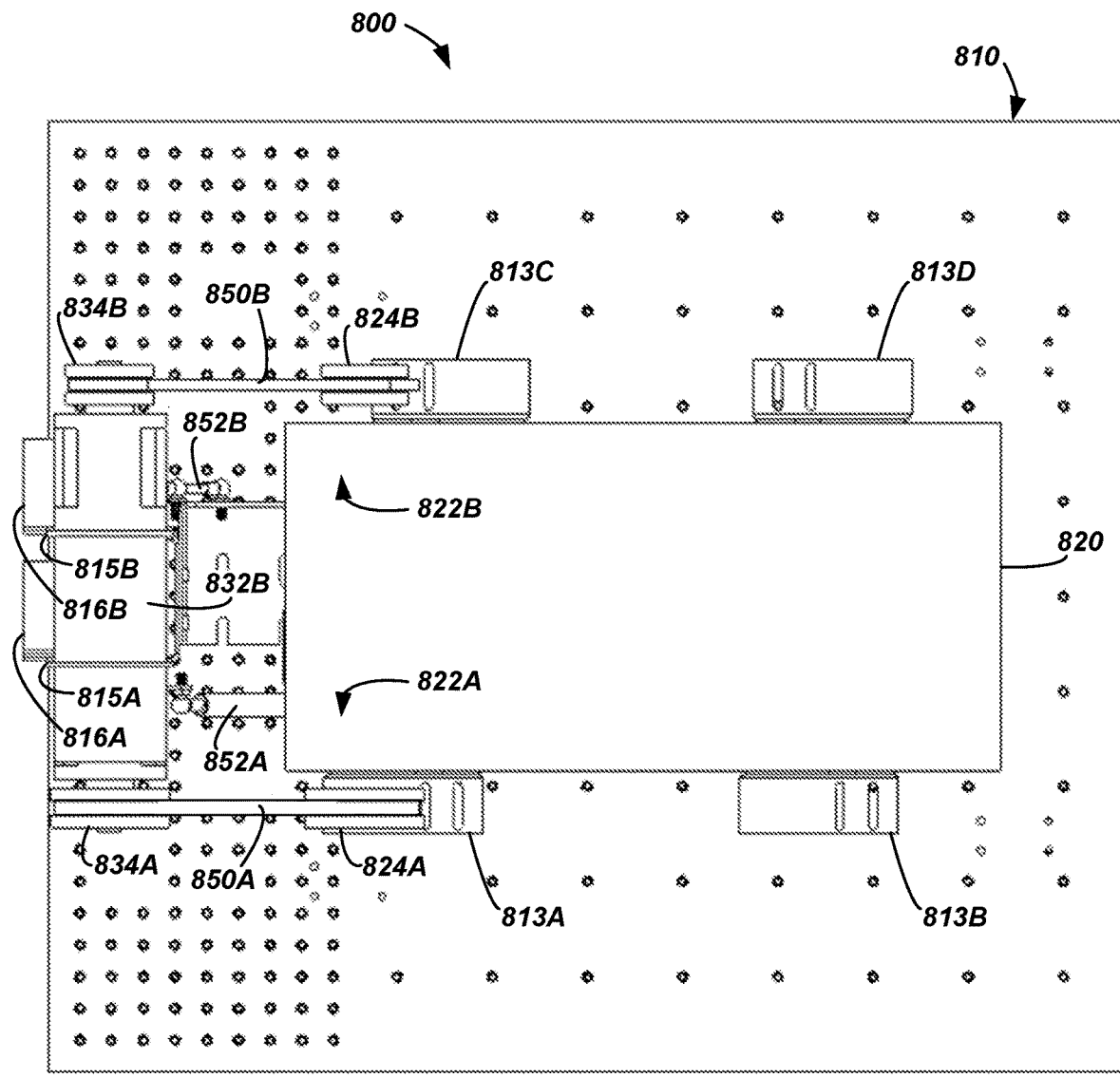

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a control logic 730 configured to control various aspects of the test systems 100, 800, 800 as described above. In different examples, the control logic 730 may be implemented in hardware, software, firmware, and/or combinations thereof. Thus, the control logic 730 may provide means (e.g., hardware, software, firmware) for controlling the gathering of data from a first vehicle under test (test vehicle) as well as sequencing different aspects and portions of the testing sequence. While the logic 730 is illustrated as a hardware component attached to the bus 708, it is to be appreciated that in one example, the logic 730 could be implemented in the processor 702.

Generally describing an example configuration of the computer 700, the processor 702 may be a variety of various processors including dual microprocessor and other multiprocessor architectures. The memory 704 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), direct RAM bus RAM (DR-RAM) and the like.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, and/or a memory stick. Furthermore, the disk 706 may be a CD-ROM, a CD recordable drive (CD-R drive), a CD rewriteable drive (CD-RW drive), and/or a digital video ROM drive (DVD ROM). The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, SATA, Infiniband, 11384, USB, Ethernet). The bus 708 can be types including, for example, a memory bus, a memory controller, a peripheral bus, an external bus, a crossbar switch, and/or a local bus.

The computer 700 may interact with the input/output devices via the input/output interfaces 718 and the input/output ports 710. The input/output devices may be, for example, a keyboard, a microphone, a pointing and selection device, cameras, video cards, displays, the disk 706, network devices 720, and so on. The input/output ports 710 may include, for example, serial ports, parallel ports, USB ports and the like.

The computer 700 can operate in a network environment and thus may be connected to the network devices 720 via the input/output interfaces 718, and/or the input/output ports 710. Through network devices 720, the computer 700 may interact with a network. Through the network, the computer 700 may be logically connected to remote computers. Networks with which the computer 700 may interact include, but are not limited to, a local area network (LAN), a wide area network (WAN), and other networks. The networks may be wired and/or wireless networks.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims. Accordingly, the disclosure is intended to embrace all such alterations, modifications, and variations that fall within the scope of this application, including the appended claims.

Moreover, the description and illustration of the invention is an example and the invention is not limited to the exact details shown or described. References to "the preferred embodiment", "an embodiment", "one example", "an example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Additionally, references to "the preferred embodiment", "an embodiment", "one example", "an example" and the like, are not to be construed as preferred or advantageous over other embodiments or designs. Rather, use of the words "the preferred embodiment", "an embodiment", "one example", "an example" and the like are intended to present concepts in a concrete fashion.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A test system comprising:
   a mounting frame for mounting a first vehicle under test to the mounting frame and configured to mount a second vehicle to the mounting frame;
   a belt configured to be rotatably attached to a rotational drive component of a propulsion system of the first vehicle and to a rotational drive component of a propulsion system of the second vehicle so that the rotational drive component the first vehicle operates at a different angular speed than the rotational drive component of the second vehicle;
   a test logic configured to control at least the propulsion system of the second vehicle to subject the first vehicle to a propulsion test;
   a measurement device configured to measure at least one parameter associated with the propulsion system of the first vehicle while the first vehicle is being subjected to the propulsion test; and
   a result logic configured to determine if the first vehicle under test passed the propulsion test based, at least in part, on an analysis of the at least one parameter, and wherein the result logic is configured to generate an indication if the first vehicle under test passed or failed the propulsion test.

2. The test system of claim 1 further comprising:
   a first pulley attached to the rotational drive component of the propulsion system of the first vehicle; and
   a second pulley attached to the rotational drive component of the propulsion system of the second vehicle, wherein the belt is rotatably attached to the rotational drive component of a propulsion system of the first vehicle by being placed at least partly around the first pulley, and wherein the belt is rotatably attached to the rotational drive component of the propulsion system of the second vehicle by being placed at least partly around the second pulley.

3. The test system of claim 1 wherein the propulsion system of the first vehicle further comprises:
   a battery power supply.

4. The test system of claim 3 wherein the first pulley has a smaller diameter than the second pulley.

5. The test system of claim 3 wherein a circumference size ratio between the first pulley and the second pulley is between the ratio of 1:8 and a ratio of 1:2.

6. The test system of claim 3 wherein the mounting frame further comprises:
   a first mounting frame section with the first vehicle under test mounted to the first mounting frame section;
   a second mounting frame section with the second vehicle mounted to the second mounting frame section, wherein the first mounting frame section pivots with respect to the second mounting frame section about a pivot point, and wherein the pivot point allows for a tension applied to the belt to be increased or decreased; and
   an extendable arm adapted to hold an end of the first mounting frame section away from the second mounting frame section to maintain a desired tension on the belt.

7. The test system of claim 1 wherein the propulsion system of the first vehicle further comprises a first motor, and wherein the propulsion system of the second vehicle further comprises a second motor.

8. The test system of claim 1 wherein the wherein the propulsion system of the first vehicle is identical to the propulsion system of the second vehicle.

9. The test system of claim 1 further comprising:
   a controller logic to dynamically control the propulsion system of the second vehicle.

10. The test system of claim 1 wherein the controller logic is configured to control a left-side propulsion of the second vehicle operating independently of a right-side propulsion of the second vehicle.

11. The test system of claim 1 further comprising:
    one or more tracks driven by the propulsion system of the first vehicle to propel the first vehicle under test across a surface.

12. The test system of claim 1 further comprising:
    a climate chamber wherein the test system is adapted to be placed inside the climatic chamber so that the first vehicle under test can be tested with different temperatures and weather conditions.

13. The test system of claim 1 wherein the measurement device measures at least one of the group consisting of: battery voltage, bus voltage, battery current, motor current, battery temperatures, ambient temperature, torque, torque request signals, motor drive current monitor signals, and a rotational speed.

14. The test system of claim 1 wherein the first vehicle is a robot propelled with tracks and the second vehicle is a robot propelled with tracks.

15. A test system comprising:
    a retention fixture is configured for rigidly mounting a first vehicle under test to the retention fixture and is configured to rigidly mount a second vehicle to the retention fixture;
    a linking device is configured to link a propulsion system of the first vehicle to a propulsion system of the second vehicle so that the propulsion system of the first vehicle operates at a different speed than the propulsion system of the second vehicle;
a test logic configured to control at least the propulsion system of the second vehicle to subject the first vehicle to a propulsion test;
a measurement device configured to measure at least one parameter associated with the propulsion system of the first vehicle while the first vehicle is being subjected to the propulsion test; and
a result logic configured to determine if the first vehicle under test passed the propulsion test based, at least in part, on an analysis of the at least one parameter, and wherein the result logic is configured to generate an indication if the first vehicle under test passed or failed the propulsion test.

16. The test system of claim 15 wherein the linking device further comprises:
a belt;
a first pulley attached to a rotational drive component of the propulsion system of the first vehicle; and
a second pulley attached to a rotational drive component of the propulsion system of the second vehicle, wherein the belt is rotatably attached to the rotational drive component of a propulsion system of the first vehicle by being placed at least partly around the first pulley, and wherein the belt is rotatably attached to the rotational drive component of the propulsion system of the second vehicle by being placed at least partly around the second pulley.

17. The test system of claim 16 wherein the first pulley has a smaller diameter than the second pulley.

18. The test system of claim 16 wherein a circumference size ratio between the first pulley and the second pulley is between the ratio of 1:8 and a ratio of 1:2.

19. The test system of claim 15 wherein the first vehicle is a tracked robotic vehicle and the second vehicle is a tracked robotic vehicle.

20. A method of testing a vehicle comprising:
coupling a propulsion system of a first vehicle under test to a propulsion system of a second vehicle so that a speed of the propulsion system of a first vehicle is reduced compared to a speed of the second vehicle;
performing a run test where the second vehicle use the propulsion system of the second vehicle to simulate the first vehicle to respond to the run test, wherein the run test was derived from values associated with a test run of a benchmark vehicle navigating a test track;
determining if the first vehicle under test passed the run test based, at least in part, on result signals derived from the first vehicle during the run test; and
outputting an indication if the first vehicle passed the test base, at least in part, on the results signals.

21. The method of claim 20 further comprising:
capturing torque request and motor control signals from test vehicle, and wherein the run test is based, at least in part, on torque request and motor control signals translated into current and power profiles for each side of the second vehicle; and
using two DC programmable load banks in combination to drive motors of the second vehicle according to a function based, at least in part, on the current and power profiles.

22. The method of claim 20 further comprising:
simulating several natural terrains where the torque request signal is on average less than the torque required to spin two robot tracks in direct contact with one another.

23. The method of claim 20, wherein two computer-controlled, independent DC programmable load banks for both a left-side track and a right-side track of the second vehicle, and wherein the test is performed based on the computer-controlled, independent DC programmable load banks.

* * * * *